United States Patent [19]

Kishi et al.

[11] Patent Number: 4,703,415
[45] Date of Patent: Oct. 27, 1987

[54] METHOD OF APPROACH IN AREA CUTTING

[75] Inventors: Hajimu Kishi; Masaki Seki; Takashi Takegahara; Yasushi Onishi, all of Tokyo, Japan

[73] Assignee: Fanuc Ltd, Minamitsuru, Japan

[21] Appl. No.: 746,034

[22] PCT Filed: Oct. 12, 1984

[86] PCT No.: PCT/JP84/00483

§ 371 Date: Jun. 10, 1985

§ 102(e) Date: Jun. 10, 1985

[87] PCT Pub. No.: WO85/01682

PCT Pub. Date: Apr. 25, 1985

[30] Foreign Application Priority Data

Oct. 15, 1983 [JP] Japan .................................. 58-193032

[51] Int. Cl.$^4$ ............................................. G05B 13/04
[52] U.S. Cl. .................................... 364/170; 364/474; 318/572; 409/80; 408/10; 408/13
[58] Field of Search ................................ 364/167–170, 364/474, 475; 408/8, 10–13; 82/2 B, 5; 409/80; 318/572, 573

[56] References Cited

U.S. PATENT DOCUMENTS

| | | | |
|---|---|---|---|
| 4,173,786 | 11/1979 | Kuhnell et al. | 364/475 |
| 4,337,599 | 7/1982 | Koide et al. | 364/474 |
| 4,365,300 | 12/1982 | Johansen et al. | 364/474 |
| 4,442,493 | 4/1984 | Wakai et al. | 364/475 |
| 4,503,493 | 3/1985 | Burkhardt et al. | 364/170 |
| 4,516,211 | 5/1985 | Nozawa et al. | 364/170 |
| 4,550,378 | 10/1985 | Nozawa et al. | 364/167 |
| 4,569,263 | 2/1986 | Kravets | 83/19 |
| 4,575,791 | 3/1986 | Schwefel | 364/168 |
| 4,580,225 | 4/1986 | Thompson | 364/474 |
| 4,597,040 | 6/1986 | Buizer | 364/170 |

Primary Examiner—Jerry Smith
Assistant Examiner—John R. Lastova
Attorney, Agent, or Firm—Staas & Halsey

[57] ABSTRACT

A method of approach in area cutting includes giving in advance an angle $\theta$ between a workpiece plane (WPL) and a straight line (SL) connecting an approach starting point ($P_A$) and a cutting starting point ($P_i$), and a distance dz between the approach starting point ($P_A$) and the cutting starting point ($P_i$) in a direction perpendicular to the workpiece plane. Coordinate values of the approach starting point ($P_A$) are calculated using the angle $\theta$ and the distance dz in such a manner that a projection (SL') of the straight line (SL) on the workpiece plane (WPL) is brought into orientation with a direction of a normal line at the cutting starting point ($P_i$) on a curve (OLC) of the external shape. A tool (TL) is positioned at the approach starting point ($P_A$) in a rapid-traverse mode, and the tool is subsequently moved to the cutting starting point ($P_i$) in a cutting-feed mode. Thereafter, cutting is started.

5 Claims, 8 Drawing Figures

METHOD OF APPROACH IN AREA CUTTING

BACKGROUND OF THE INVENTION

This invention relates to a method of approach in area cutting for cutting the interior of an area surrounded by the curve of an external shape. More particularly, the invention relates to a method of approach so adapted that in moving a tool toward a cutting starting point, the tool is moved obliquely with respect to a workpiece, so that the tool will cut into the workpiece without fail.

Forms of numerically controlled machining include cutting, in which the interior of an area bounded by the curve of an external shape is hollowed out down to a predetermined depth, and die milling in which the interior of an area is die milled. In such cutting of the interior of an area, as shown in FIG. 1, the process includes entering the curve OLC of an external shape of an area AR, cutting direction (direction of arrow A), cut-in direction (direction of arrow B), and cut-in pitch P; creating a cutting path $PT_i$ (i=1, 2, ...) on the basis of the entered data; performing cutting my moving a tool TL in the cutting direction along the created cutting path $PT_i$; creating the next cutting path $PT_{i+1}$ by effecting a shift corresponding to the aforementioned pitch in the cut-in direction (direction of arrow B) after the completion of cutting along the above-mentioned cutting path; performing cutting by moving the tool in the cutting direction (direction of arrow A) along the next cutting path; and thereafter repeating this unidirectional cutting to cut the area AR. It should be noted that, for each cutting path $PT_i$, two points $P_i$, $Q_i$ where the curve OLC of the external shape is intersected by a straight line $SL_i$ determined by the cut-in direction and pitch are specified as machining starting and end points, respectively. A tool referred to as an end mill is used as the tool TL. As shown in FIG. 2, an end mill includes a bottom surface having cutting edges BT1, BT2, and a cutter side having a cutting edge BT3. Longitudinal cutting is performed by the cutting edges BT1, BT2, and transverse cutting is carried out by the cutting edge BT3. Little cutting force is applied in the longitudinal direction, and great cutting force is applied in the transverse direction.

The workpiece is a solid material prior to the cutting of an area. Moreover, the center position CP (see FIG. 2) of the bottom surface of tool (end mill) TL does not rotate (i.e., is stationary), even when the tool TL is rotated. Consequently, when the initial cut is to be made, even though the tool TL is moved for cutting feed from an approach starting point $P_a$, which is located directly above the cutting starting point $P_i$, as shown in FIG. 3, toward the cutting starting point $P_i$ while being rotated, the tool TL slides along the surface of the workpiece WK rather than cutting into the workpiece or, even if it does cut into the workpiece, it fails to do so smoothly and results in a machining error.

Accordingly, a hole is bored in advance at the initial cutting starting point $P_i$ so that the tool TL will be sure to cut into the workpiece WK when the approach is made. However, this method is disadvantageous in that it necessitates the hole boring step prior to the cutting of the area and prolongs machining time.

SUMMARY OF THE INVENTION

An object of the present invention is to provide a method of approach in area cutting, whereby a tool will cut into a workpiece without fail when making an approach, even at initial cutting.

Another object of the present invention is to provide a method of approach in area cutting, whereby a tool will cut into a workpiece without fail when making an approach, even if a hole or the like is not bored beforehand at the cutting starting point.

The present invention provides a method of approach in area cutting for cutting the interior of an area bounded by the curve of an external shape. The method includes giving in advance an angle $\theta$ between a workpiece plane and a straight line connecting an approach starting point and a cutting starting point, and a distance dz between the approach starting point and the cutting starting point in a direction perpendicular to the workpiece plane; calculating coordinate values of the approach starting point using the angle $\theta$ and the distance dz in such a manner that a projection of the straight line on the workpiece plane is brought into coincidence with a direction of a normal line at the cutting starting point on the curve of the external shape; positioning the tool at the approach starting point in a rapid-traverse mode; subsequently moving the tool to the cutting starting point in a cutting-feed mode; and thereafter starting cutting. According to the approach method of the present invention, the tool TL is moved toward the cutting straight point obliquely with respect to the workpiece WK. As a result, even though the workpiece is a solid member when the approach is made, the tool is capable of cutting into the workpiece smoothly without fail.

DETAILED DESCRIPTION OF THE PREFERRED EMBODIMENT

Figure 4A:
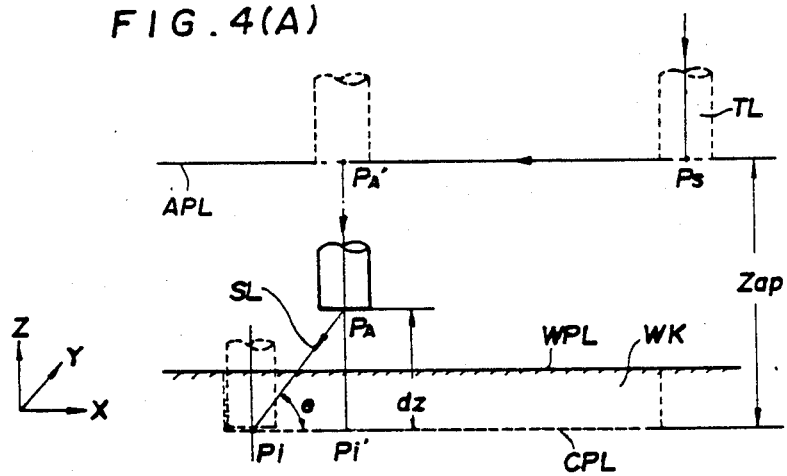
FIGS. 4(A) and 4(B) are diagrams for describing a method of approach in area cutting according to the present invention.
Figure 4B:
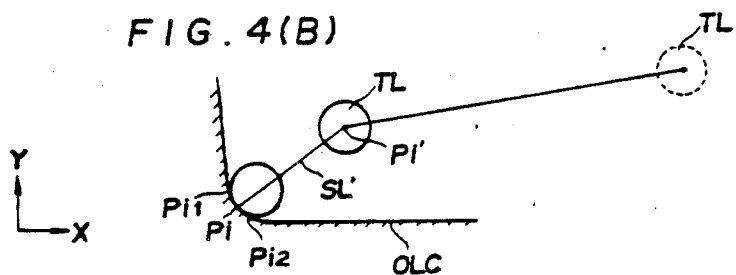

FIG. 4 is a diagram for describing the method of the present invention, in which FIG. 4(A) is a sectional view and FIG. 4(B) a plan view. The method of approach of the present invention includes giving in advance an angle $\theta$ between a workpiece plane WPL and a straight line SL connecting an approach starting point $P_A$ and a cutting starting point $P_i$. Also given in advance is a distance dz between the approach starting point $P_A$ and the cutting starting point $P_i$ in a direction perpendicular to the workpiece plane. The method further includes calculating coordinate values of the approach starting point $P_A$ using the angle $\theta$ and the distance dz, in such a manner that a projection SL' [see FIG. 4(B)] of the straight line SL on the workpiece plane WPL, is brought into coincidence with a direction of a normal line at the cutting starting point $P_i$ on the curve OLC of the external shape; positioning the tool TL at the approach starting point $P_A$ in a rapid-traverse mode; subsequently moving the tool to the cutting starting point $P_i$ in a cutting-feed mode; and thereafter starting cutting.

Figure 5:
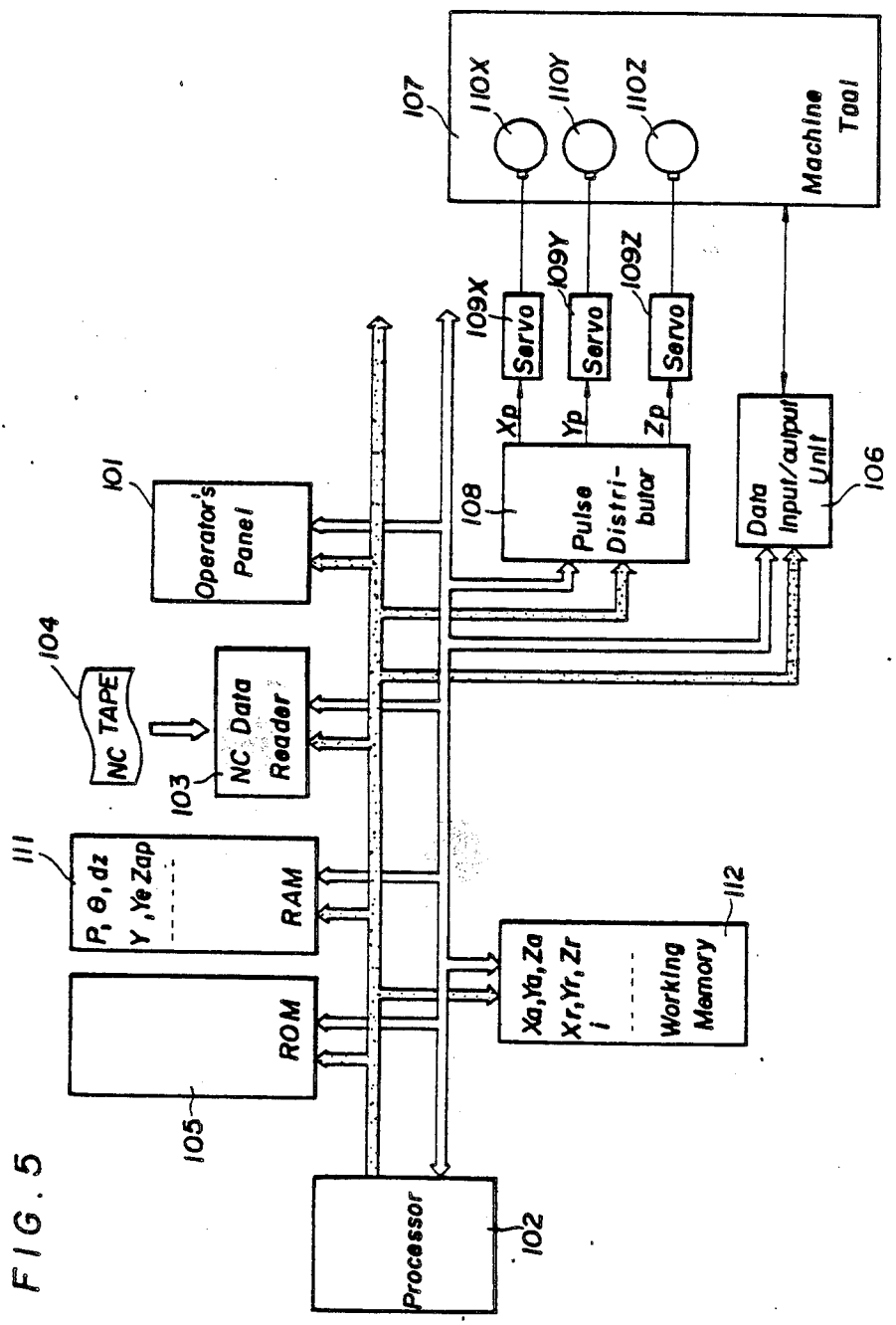
FIG. 5 is a block diagram of an embodiment of the present invention.
Figure 6A:
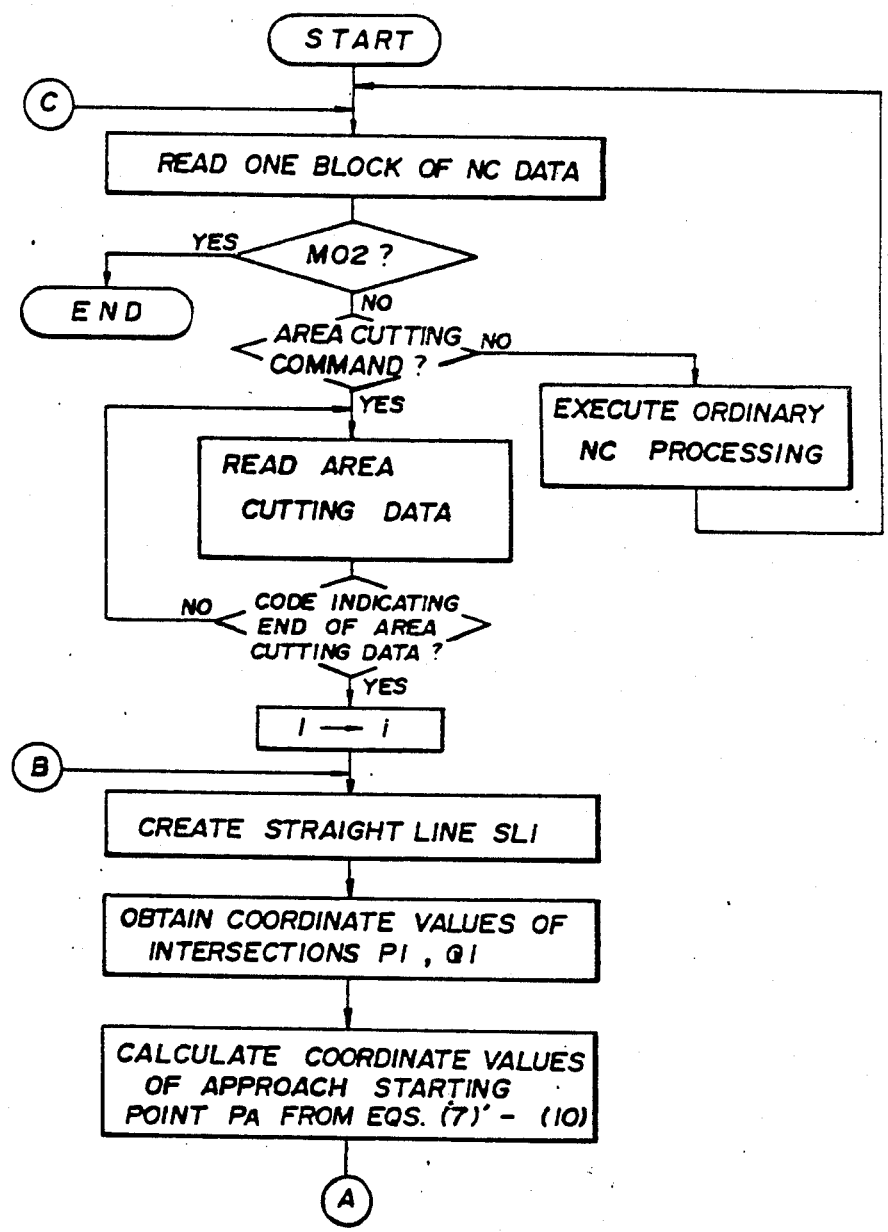
FIGS. 6(A) and 6(B) are flowchart of processing according to the present invention.
Figure 6B:
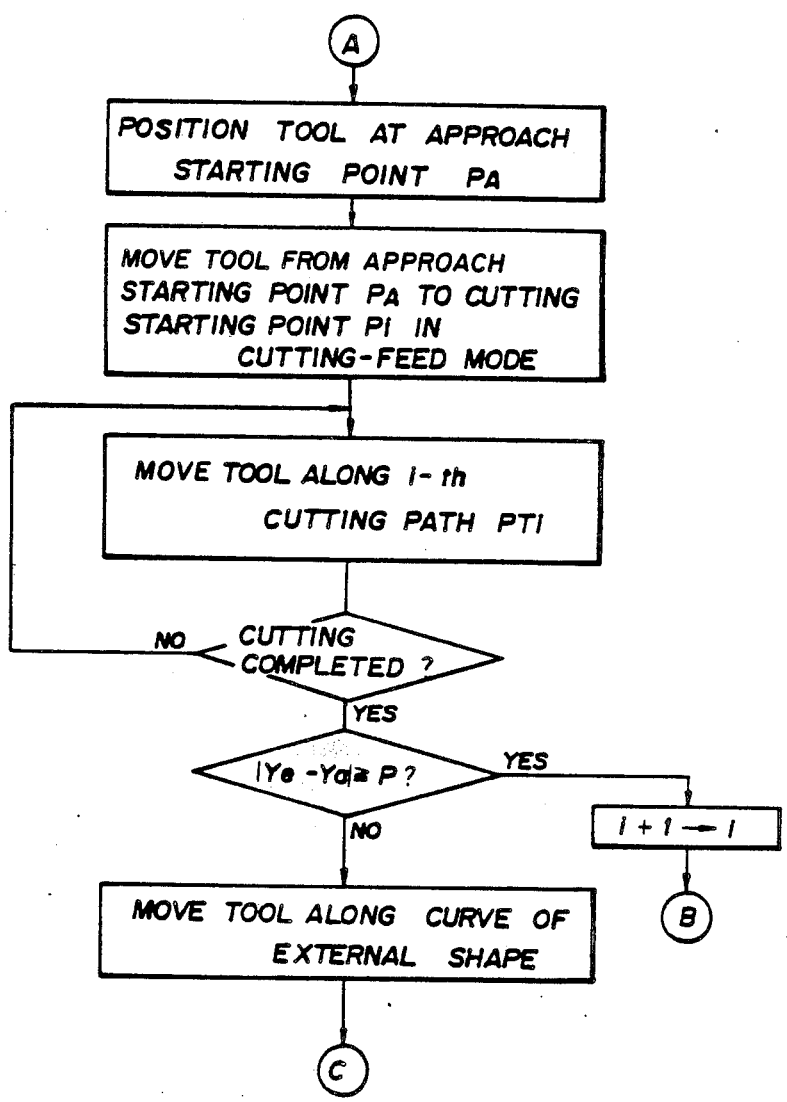

FIG. 5 is a block diagram of an embodiment of the present invention, and FIG. 6 is a flowchart of processing.

(1) When a cycle start button on an operator's panel 101 is pressed, a processor 102 causes an NC data reader 103 to read one block of NC data from an NC tape 104. The NC tape 104 stores area cutting data in addition to ordinary path data, G-function instruction data and M-, S- and T-function instruction data. Stored at the end of the NC program is an M code (M02) indicating program end. Placed at the beginning of the area cutting data is an area cutting command indicating that the data which follow are the area cutting data. Placed at the end of the area cutting data is a code indicative of the end of the area cutting data.

(2) The processor 102, placed under the control of a control program stored in a ROM 105, checks whether an item of the read NC data is "M02", which is indicative of program end. If the item of data is "M02", numerical control processing is ended.

(3) If the item of read NC data is not "M02" indicative of program end, then the processor 102 checks whether the item of NC data is the area cutting command.

(4) If the item of NC is not the area cutting command, the processor 102 executes ordinary numerical control processing.

By way of example, if an item of NC data is an M-, S- or T-function instruction, the processor delivers the data to a machine tool 107 via a data input/output unit 106 functioning as an interface circuit between an NC unit and the machine. In response to a completion signal received as an answer from the machine tool 107 indicating completion of processing for the M-, S- or T-function instruction, the processor causes the NC data reader 103 to read the next item of NC data. If the item of NC data is path data, then the following path control processing is executed. Specifically, the processor obtains incremental values $X_i$, $Y_i$, $Z_i$ along the respective axes, and obtains velocity components $F_x$, $F_y$, $F_z$ along the respective axes from equations $$F_x = X_i \cdot F / \sqrt{X_i^2 + Y_i^2 + Z_i^2} \tag{1a}$$

$$F_y = Y_i \cdot F / \sqrt{X_i^2 + Y_i^2 + Z_i^2} \tag{1b}$$

$$F_z = Z_i \cdot F / \sqrt{X_i^2 + Y_i^2 + Z_i^2} \tag{1c}$$

based on the incremental values and a commanded feed velocity F. Thereafter, the processor obtains travelling quantities $\Delta X$, $\Delta Y$, $\Delta Z$, which are to be traversed along the respective axes in a predetermined period of time $\Delta T$ seconds (=8 msec), from equations $$\Delta X = F_x \Delta T \tag{2a}$$

$$\Delta Y = F_y \Delta T \tag{2b}$$

$$\Delta Z = F_z \Delta T \tag{2c}$$

The processor delivers $\Delta X$, $\Delta Y$, $\Delta Z$ to a pulse distributor 108 every $\Delta T$ sec. On the basis of the input data ($\Delta X$, $\Delta Y$, $\Delta Z$), the pulse distributor 108 performs a simultaneous three-axis pulse distribution calculation to generate distributed pulses $X_P$, $Y_P$, $Z_P$. The distributed pulses are applied as inputs to servo circuits 109X, 109Y, 109Z for the respective axes to rotate servomotors 110X, 110Y, 110Z. The tool is thus moved relative to the workpiece toward a target position.

The procesor 102, in accordance with the following formulae, updates the present position $X_1$, $Y_a$ $Z_a$ along the respective axes every $\Delta T$ sec, $X_a$, $Y_a$, $Z_a$ having been stored in a working memory 112:

$$X_a \pm \Delta X \rightarrow X_a \tag{3a}$$

$$Y_a \pm \Delta Y \rightarrow Y_a \tag{3b}$$

$$Z_a \pm \Delta Z \rightarrow Z_a \tag{3c}$$

The sign depends upon the direction of movement. Similarly, in accordance with the following formulae, the processor 102 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the working memory 112:

$$X_r - \Delta X \rightarrow X_r \tag{4a}$$

$$Y_r - \Delta Y \rightarrow Y_r \tag{4b}$$

$$Z_r - \Delta Z \rightarrow Z_r \tag{4c}$$

When the following condition is established:

$$X_r = Y_r = Z_r = 0 \tag{5}$$

the processor 102 then causes the NC data reader 103 to read the next item of NC data.

Figure 1:
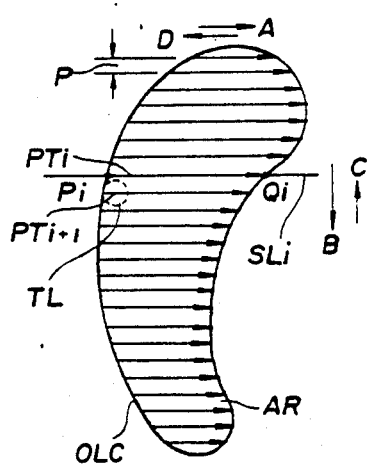
FIG. 1 is a diagram for describing the cutting of an area.
Figure 2:
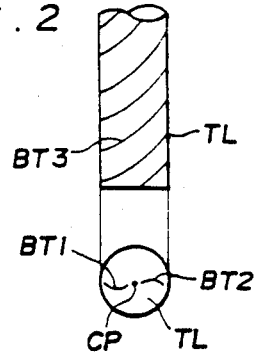
FIG. 2 is a view for describing a tool.
Figure 3:
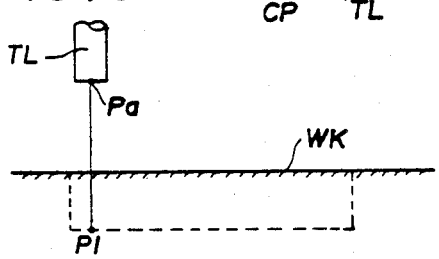
FIG. 3 is a diagram for describing the shortcomings of the conventional method.

(5) If the item of NC data is found to be the area cutting command at the decision step (3), the processor 102 causes the NC data reader 103 to read the area cutting data and store the data in a RAM 111 until the code indicating the end of the area cutting data is read out. It should be noted that the area cutting data are (1) data indicating the curve of the external shape of the area, (2) cutting direction data (data indicating that the tool is to be moved in the direction of the arrow A or in the direction of an arrow D in FIG. 1), (3) cut-in direction data (data indicating that the tool is to be moved in the direction of the arrow B or in the direction of an arrow C in FIG. 1), (4) pitch P in the cut-in direction, (5) cutting velocity, (6) cut-in direction starting point, (7) cut-in direction end point, (8) position ($Z_{ap}$) of approach plane APL [see FIG. 4(A)], (9) the angle $\theta$ between the workpiece plane and a straight line connecting the approach starting point $P_A$ and cutting starting point $P_i$, (10) the distance dz between the approach starting point $P_A$ and the cutting starting point $P_i$ in a direction perpendicular to the workpiece plane, etc.

(6) When the area cutting data are finished being read, the processor 102 performs the operation $$1 \rightarrow i$$

on i, which is stored in the working memory 112. Hereafter we will assume that the cutting direction is the $+X$ direction, that the cut-in direction is the $+Y$ direction, that the approach plane is parallel to the XY plane at a height $Z_{ap}$, that the cut-in direction starting point is $Y_s$, and that the cut-in direction end point is $Y_e$.

(7) Next, the processor 102 performs processing for specifying an i-th cutting path $PT_i$. Specifically, the processor 102 creates the straight line $SL_i$ (see FIG. 1). The straight line $SL_i$ is expressed by the equation $$y = Y_s + P \cdot i \tag{6}$$

(8) Thereafter, the processor 102 calculates the coordinate values of the points $P_i$, $Q_i$ where the straight line $SL_i$ intersects the curve OLC of the external shape of the area. Of the intersection points $P_i$, $Q_i$, the intersection point Pi, which has the smaller X coordinate value, is treated as the cutting starting point of the i-th cutting path $PT_i$, and the intersection point $Q_i$, which has the larger X coordinate value, is treated as the cutting end point of the i-th cutting path $PT_i$.

(9) After the coordinate values $(X_{io}, Y_{io}, Z_{io})$ of the cutting starting point $P_i$ are calculated in the above manner, the processor 102 calculates the coordinate values $(X_A, Y_A, Z_A)$ of the approach starting point $P_A$ by using the coordinate values of the cutting starting point $P_i$, the angle $\theta$ and the distance dz. More specifically, first the processor finds the normal line to the external shape curve OLC [see FIG. 4(B)] at the cutting starting point $P_i$. The normal line lies on the XY plane and is obtained in the following manner:

If two points $P_{i1}$, $P_{i2}$ lying on the external shape curve OLC on either side of the cutting starting point $P_i$ are found and a circle passing through these three points $P_{i1}$, $P_i$, $P_{i2}$ is obtained, then the straight line connecting the center of this circle and the cutting starting point $P_i$ will be the normal line. Accordingly, the normal line is specified by the equation $$y = a \cdot x + b \tag{7}$$

where a and b are coefficients. Letting $X_A$, $Y_A$ be the coordinate values of the approach starting point $P_a$ along the X and Y axes, respectively, the following equation will hold:

$$Y_A = a \cdot X_A + b \tag{7'}$$

For a case where the curve OLC of the external shape is composed of a number of line segments and circular arcs, if the cutting starting point $P_i$ lies on a predetermined line segment, then the normal line will be a straight line perpendicular to the line segment and passing through the cutting starting point; if the cutting starting point $P_i$ lies on a predetermined circular arc, then the normal line will be a straight line connecting the cutting starting point $P_i$ and the center of the circular arc.

If we assume that the projection of the approach starting point $P_A$ $(X_A, Y_A, Z_A)$ on a cutting plane CPL is $P_i'$, the three-dimensional coordinate values thereof will be $(X_A, Y_A, Z_{io})$. Accordingly, letting D be the distance between the cutting starting point $P_i$ and the projected point $P_i'$, the following equations will hold:

$$D = \sqrt{(X_A - X_{io})^2 + (Y_A - Y_{io})^2} \tag{8}$$

$$\tan \theta = dz/D \tag{9}$$

$$Z_A - Z_{io} = dz \tag{10}$$

On the basis of the foregoing, the processor 102 obtains the coordinate values $(X_A, Y_A, Z_A)$ of the approach starting point from Eqs. (7)' through (10).

(10) When the coordinate values of the approach starting point $P_A$ are thus obtained, the processor 102 moves the tool TL along the Z axis from the present position (not shown) to a point Ps [see FIG. 4(A)] on the approach plane APL in the rapid-traverse mode, thereafter positions the tool at a point $P_A'$ on the approach plane APL in the rapid-traverse mode by simultaneous two-axis control along the X and Y axes, and then moves the tool along the Z axis to the approach starting point $P_A$ in the rapid-traverse mode. This completes positioning of the tool TL at the approach starting point $P_A$. It should be noted that the numerical control processing for the positioning from the present position to the point $P_s$, from the point $P_s$ to the point $P_A'$ and from the point $P_A'$ to the point $P_A$ is performed in a manner similar to the path control processing of the step (4).

(11) When positioning of the tool at the approach starting point $P_A$ is concluded, the processor 102 obtains incremental quantities $X_i$, $Y_i$, $Z_i$ between $P_A$ and $P_i$ and executes the path control processing of the step (4) by using these incremental quantities and the cutting velocity F. As a result, the tool TL is transported from the approach starting point $P_A$ to the cutting starting point $P_i$ at the cutting velocity F. In the course of travel the tool begins to cut into the workpiece WK and finally arrives at the cutting starting point $P_i$. This completes the approach operation.

(12) When the approach is completed, the processor 102 treats the point $P_i$ as the cutting starting point and the point $Q_i$ as the cutting end point and, in like fashion, moves the tool along the +X axis in the rapid-traverse mode to perform cutting along the i-th cutting path.

(13) When cutting is completed, the processor 102 obtains the difference $(= |Y_e - Y_a|)$ between the present position coordinate $Y_a$ (stored in the working memory 112) along the Y axis and Y-axis coordinate $Y_e$ of the cut-in direction end point and checks whether or not the difference is greater than the pitch quantity P.

(14) If $|Y_e - Y_a| \geq P$ holds, the processor 102 performs the operation $$i + 1 \rightarrow i$$

and repeats the processing from step (7) onward.

(15) If $|Y_e - Y_a| < P$ is found to hold at the decision step (13), then the processor 102 finally performs cutting by transporting the tool along the curve OLC of the external shape of the area, thereafter causing the NC data reader 103 to read the next item of NC data and repeating the processing from step (2) onward.

Though the present invention has been described in detail in accordance with the drawings, the invention is not limited to the illustrated embodiment. For example, in the embodiment described, an area cutting command is inserted into the NC tape, an approach path and cutting paths are created by using the area cutting data that follow the area cutting command, and area cutting is performed along these paths. However, an arrangement can be adopted in which NC data for moving the tool along the approach path and cutting paths are created by the aforementioned method, the NC data are recorded on an NC tape, and approach and cutting control are performed by feeding the NC data recorded on the NC tape into an NC unit.

According to the present invention, a tool is made to approach a workpiece plane obliquely, so that the workpiece may be cut by the cutting edge formed at the cutter side. This enables an improvement in cutting performance, allows the tool to cut into the workpiece smoothly when an approach is made, and permits cutting to be performed efficiently. Further, since the arrangement is such that the tool approaches the workpiece plane obliquely according to the present invention, a hole or the like need not be bored in advance at the cutting starting point. This shortens machining time and enables highly accurate area cutting to be performed. Accordingly, the present invention is well-suited for application to NC data creation systems for machine tool control or area cutting control, wherein area cutting is performed by numerical control.

What is claimed is:

1. A method of approach in area cutting for cutting the interior of an area bounded by a curve of an external shape, comprising the steps of:
    (a) storing in memory an angle $\theta$ between a workpiece plane and a straight line connecting an approach starting point and a cutting starting point, and storing in memory a distance dz between the approach starting point and the cutting starting point in a direction perpendicular to the workpiece plane;
    (b) calculating coordinate values for the approach starting point using the angle $\theta$ and the distance dz, so that the direction of a projection of the straight line on the workpiece plane coincides with a direction of a normal line which is normal to the curve of the external shape at the cutting starting point; and
    (c) positioning a tool at the approach starting point;
    (d) automatically moving the tool to the cutting starting point in a cutting feed mode by moving the tool obliquely with respect to the workpiece in a direction defined by the entered angle data and thereafter starting cutting in the interior of the area bounded by the curve of the external shape.

2. A method of approach in area cutting according to claim 1, wherein said step (b) includes specifying the normal line by $y = a \cdot x + b$, where a and b are coefficients, and obtaining three-dimensional coordinate values $(X_A, Y_A, Z_A)$ for the approach starting point according to $$Y_A = a \cdot X_A + b$$

$$D = \sqrt{(X_A - X_{io})^2 + (Y_A - Y_{io})^2}$$

$$\tan \theta = dz/D$$

$$Z_A - Z_{io} = dz$$

where $(X_{io}, Y_{io}, Z_{io})$ are three-dimensional coordinate values for the cutting starting point and D is the distance between the cutting starting point and a projection of the approach starting point on a plane containing the cutting starting point.

3. A method of approach in area cutting for cutting the interior of an area bounded by a curve of an external shape, comprising the steps of:
    (a) storing in memory a predetermined angle $\theta$ between a workpiece plane and a straight line connecting an approach starting point and a cutting starting point, storing in memory a predetermined distance dz between the approach starting point and the cutting starting point in a direction perpendicular to the workpiece plane, and storing in memory data necessary for creating NC data indicative of area cutting, including data indicating the curve of the external shape, cutting direction data, cut-in direction data, data representing pitch in the cut-in direction, and data representing the position of the approach plane;
    (b) obtaining the cutting starting point for area cutting by processing the data necessary for creating NC data;
    (c) calculating coordinate values of the approach starting point using the angle $\theta$ and the distance dz, so that the direction of a projection of the straight line on the workpiece plane coincides with a direction of a normal line which is normal to the curve of the external shape at the cutting starting point; and
    (d) creating NC data for positioning the tool at the approach starting point based on the cutting starting point obtained in said step (b) and the coordinate values of the approach starting point calculated in said step (c), as well as NC data for moving the tool from the approach starting point to the cutting starting point in a cutting-feed mode, the approach of the tool being controlled based on the NC data.

4. A method of approach in area cutting according to claim 1, wherein said step (b) includes specifying the normal line by $y = a \cdot x + b$, where a and b are coefficients, and obtaining three-dimensional coordinate values $(X_A, Y_A, Z_A)$ for the approach starting point according to $$Y_A = a \cdot X_A + b$$

$$D = \sqrt{(X_A - X_{io})^2 + (Y_A - Y_{io})^2}$$

$$\tan \theta = dz/D$$

$$Z_A - Z_{io} = dz$$

where $(X_{io}, Y_{io}, Z_{io})$ are three-dimensional coordinate values for the cutting starting point, and D is the distance between the cutting starting point and a projection of the approach starting point on a plane containing the cutting starting point.

5. A method of approach in area cutting for cutting the interior of an area bounded by a curve of an external shape, comprising the steps of:
    (a) storing in memory curve data corresponding to the curve of an external shape of an area;
    (b) storing in memory entered angle data corresponding to an angle between a workpiece plane and a straight line connecting an approach starting point and a cutting starting point;
    (c) storing in memory distance data corresponding to a distance between the workpiece plane and the approach starting point in a direction perpendicular to the workpiece plane;
    (d) automatically calculating coordinate values for the approach starting point based on the stored angle data and the stored distance data, so that a projection of a straight line connecting the approach starting point and the cutting starting point on the workpiece plane exends to the cutting starting point and is normal to the curve of the external shape at the cutting starting point;
    (e) automatically positioning a tool at the approach starting point;
    (f) automatically moving the tool to the cutting starting point in a cutting feed mode by moving the tool obliquely with respect to the workpiece in a direction defined by the entered angle data; and
    (g) initiating cutting in the interior of the area bounded by the curve of the external shape.

* * * * *

UNITED STATES PATENT AND TRADEMARK OFFICE
CERTIFICATE OF CORRECTION

PATENT NO. : 4,703,415
DATED      : OCTOBER 27, 1987
INVENTOR(S): HAJIMU KISHI ET AL.

It is certified that error appears in the above-identified patent and that said Letters Patent is hereby corrected as shown below:

Col. 1, line 61, "approack" should be --approach--.

Col. 4, line 4, "$X_1$" should be --$X_a$--.

Col. 8, line 22, "1," should be --3,--;

line 22, "(b)" should be --(c)--.

Signed and Sealed this

Nineteenth Day of April, 1988

Attest:

DONALD J. QUIGG

*Attesting Officer*     *Commissioner of Patents and Trademarks*